(12) United States Patent
Tseng et al.

(10) Patent No.: US 9,925,978 B2
(45) Date of Patent: Mar. 27, 2018

(54) VEHICLE PIVOT TECHNIQUE

(71) Applicant: Ford Global Technologies, LLC, Dearborn, MI (US)

(72) Inventors: Eric Hongtei Tseng, Canton, MI (US); Li Xu, Northville, MI (US); Kyle Simmons, Royal Oak, MI (US); Paul Theodosis, Ann Arbor, MI (US); Douglas Blue, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/214,132

(22) Filed: Jul. 19, 2016

(65) Prior Publication Data
US 2018/0022344 A1 Jan. 25, 2018

(51) Int. Cl.
| | |
|---|---|
| *B60W 30/06* | (2006.01) |
| *B60W 10/20* | (2006.01) |
| *B60W 10/04* | (2006.01) |
| *B60W 30/18* | (2012.01) |
| *G05D 1/00* | (2006.01) |

(52) U.S. Cl.
CPC ........... *B60W 30/06* (2013.01); *B60W 10/04* (2013.01); *B60W 10/20* (2013.01); *B60W 30/18036* (2013.01); *G05D 1/0088* (2013.01)

(58) Field of Classification Search
CPC ............... B60W 30/06; B60W 10/20; B60W 30/18036; B60W 10/04; G05D 1/0088
USPC .......................................................... 701/23
See application file for complete search history.

(56) References Cited

U.S. PATENT DOCUMENTS

| | | | |
|---|---|---|---|
| 8,115,653 B2 | 2/2012 | Scherl et al. | |
| 8,180,547 B2 | 5/2012 | Prasad et al. | |
| 8,645,015 B2 | 2/2014 | Oetiker et al. | |
| 2006/0235590 A1 | 10/2006 | Bolourchi et al. | |
| 2010/0283632 A1* | 11/2010 | Kawabata | G08G 1/166 340/932.2 |
| 2011/0087405 A1 | 4/2011 | Moshchuk et al. | |
| 2011/0102196 A1 | 5/2011 | Kadowaki et al. | |
| 2014/0188339 A1* | 7/2014 | Moon | B62D 15/0285 701/41 |
| 2015/0307089 A1* | 10/2015 | Vorobieva | B62D 15/027 701/25 |

FOREIGN PATENT DOCUMENTS

| | | |
|---|---|---|
| CN | 103158703 A | 6/2013 |
| CN | 104057950 A | 9/2014 |

(Continued)

OTHER PUBLICATIONS

Unpublished pending U.S. Appl. No. 14/991,496, filed Jan. 8, 2016 of which is not being furnished herewith, pursuant to the Commissioner's Notice dated Sep. 21, 2004.

(Continued)

*Primary Examiner* — Brian P Sweeney
(74) *Attorney, Agent, or Firm* — James P. Muraff; Neal, Gerber & Eisenberg LLP

(57) ABSTRACT

A vehicle includes: motor(s), steering, processor(s) configured to: (a) receive a current heading; (b) receive a desired heading; (c) calculate a first steering angle (FSA) based on (a) and (b); (d) move the vehicle, via the motor(s) and steering: (i) in a first direction based on the FSA; (ii) in a second, opposing direction, based on an opposite of the FSA.

19 Claims, 9 Drawing Sheets

(56) References Cited

FOREIGN PATENT DOCUMENTS

| JP | H10114274 A | 5/1998 |
|----|-------------|--------|
| KR | 1020130065115 A1 | 2/2014 |
| KR | 20150029821 A | 3/2015 |
| WO | WO 2014/167255 A1 | 10/2014 |

OTHER PUBLICATIONS

Search Report dated Dec. 1, 2017 for GB Patent Application No. 83843006 (3 Pages).

* cited by examiner

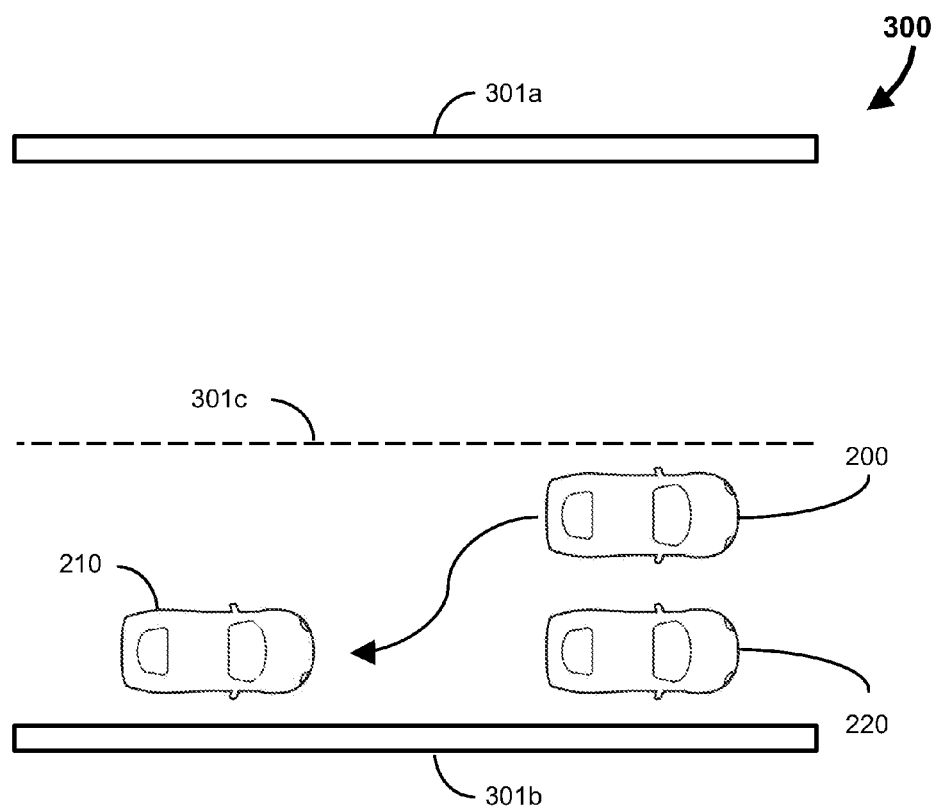

VEHICLE PIVOT TECHNIQUE

TECHNICAL FIELD

This disclosure relates to automated parking and steering of vehicles.

BACKGROUND

Prior art automatic parking systems apply complicated programs to adjust vehicle position. A simple program is needed that safely and effectively adjusts vehicle position.

SUMMARY

A vehicle consistent with the present disclosure includes: motor(s), steering, processor(s) configured to: (a) receive a current heading; (b) receive a desired heading; (c) calculate a first steering angle (FSA) based on (a) and (b); (d) move the vehicle, via the motor(s) and steering: (i) in a first direction based on the FSA; (ii) in a second, opposing direction, based on an opposite of the FSA.

A method consistent with the present disclosure includes: via processor(s) of the vehicle with motor(s) and steering: (a) receiving a current heading; (b) receiving a desired heading; (c) calculating a first steering angle (FSA) based on (a) and (b); (d) moving the vehicle, via the motor(s) and steering: (i) in a first direction based on the FSA; (ii) in a second, opposing direction, based on an opposite of the FSA.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 3a to 3e show the vehicle executing parallel park according to a method of FIG. 4.

DETAILED DESCRIPTION OF EXAMPLE EMBODIMENTS

Figure 1:
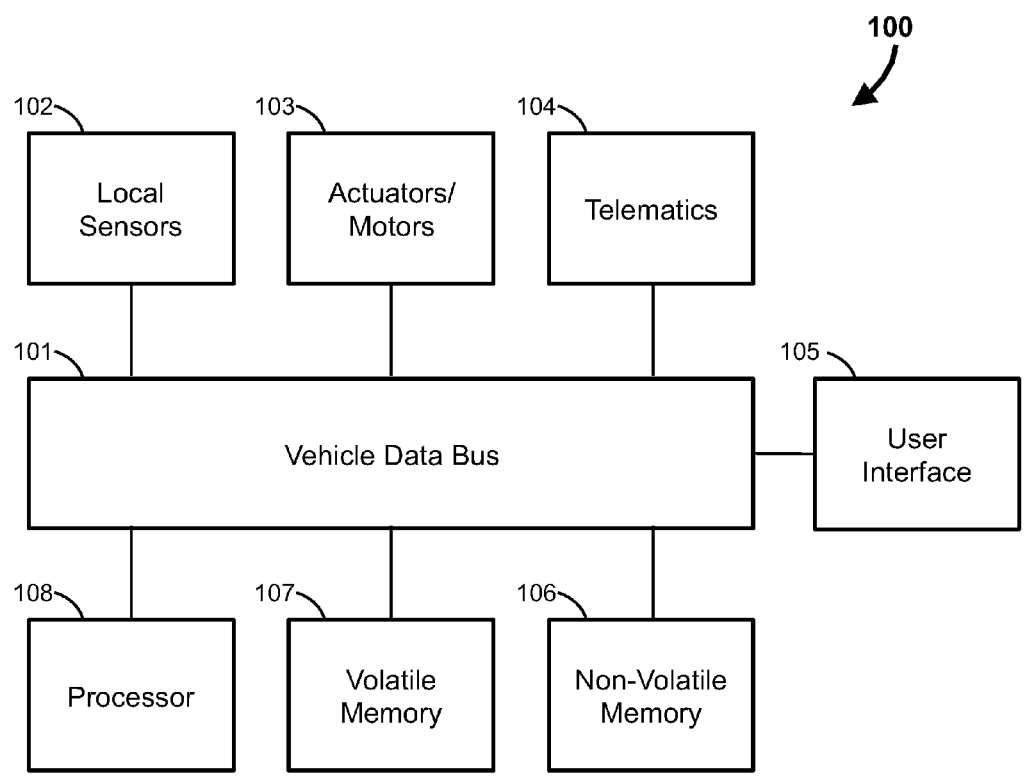
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of an example vehicle 200. The vehicle 200 is also referred to as a first vehicle 200. The vehicle 200 includes a motor, a battery, at least one wheel driven by the motor, and a steering system configured to turn the at least one wheel about an axis. Suitable vehicles are also described, for example, in U.S. patent application Ser. No. 14/991,496 to Miller et al. ("Miller") and U.S. Pat. No. 8,180,547 to Prasad et al. ("Prasad"), both of which are hereby incorporated by reference in their entireties. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency.

The actuators/motors 103 produce physical results. Examples of actuators/motors include fuel injectors, windshield wipers, brake light circuits, transmissions, airbags, engines, power train motors, steering, etc. The local sensors 102 transmit digital readings or measurements to the processor 108. Examples of suitable sensors include temperature sensors, rotation sensors, seatbelt sensors, speed sensors, cameras, lidar sensors, radar sensors, etc. It should be appreciated that the various connected components of FIG. 1 may include separate or dedicated processors and memory. Further detail of the structure and operations of the computing system 100 is described, for example, in Miller and/or Prasad.

Figure 2:
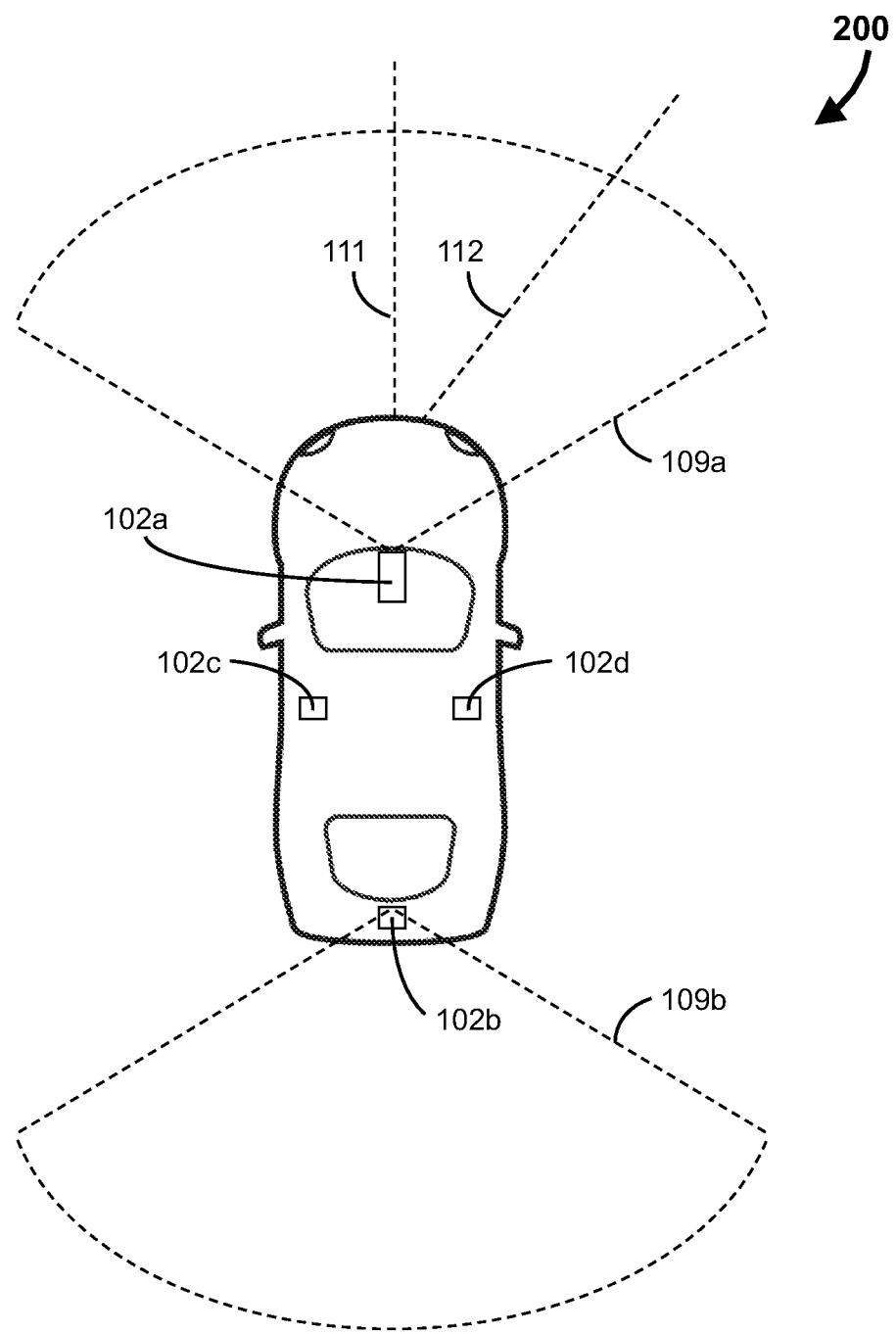
FIG. 2 is a schematic of a vehicle including the vehicle computing system.

FIG. 2 generally shows and illustrates the vehicle 200, which includes the computing system 100. Although not shown, the vehicle 200 is in operative wireless communication with a nomadic device, such as a mobile phone. Some of the local sensors 102 are mounted on the exterior of the vehicle 200. Local sensor 102a may be an ultrasonic sensor, a lidar sensor, a camera, a video camera, and/or a microphone, etc. Local sensor 102a may be configured to detect objects leading the vehicle 200 as indicated by leading sensing range 109a. Local sensor 102b may be an ultrasonic sensor, a lidar sensor, a camera, a video camera, and/or a microphone, etc. Local sensor 102b may be configured to detect objects trailing the vehicle 200 as indicated by leading sensing range 109b. Left sensor 102c and right sensor 102d may be configured to perform the same functions for the left and right sides of the vehicle 200. The vehicle 200 includes a host of other sensors 102 located in the vehicle interior or on the vehicle exterior. These sensors may include any or all of the sensors disclosed in Prasad.

It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device or an external server in operative communication with the vehicle 200 perform some or all of the methods and operations discussed below.

According to various embodiments, the vehicle 200 includes some or all of the features of the vehicle 100a of Prasad. In various embodiments, the computing system 100 includes some or all of the features of the VCCS 102 of FIG. 2 of Prasad. In various embodiments, the vehicle 200 is in communication with some or all of the devices shown in FIG. 1 of Prasad, including the nomadic device 110, the communication tower 116, the telecom network 118, the Internet 120, and the data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Returning to FIG. 2, the vehicle 200 (i.e., the first vehicle 200) has a current heading 111. The current heading 111 is along a reference line segment bisecting the vehicle 200 and generally perpendicular to the axles. A driver (which may be an automated program) of the vehicle 200 has assigned a desired heading 112. The vehicle 200 steers to match the current heading 111 with the desired heading 112.

Figure 4:
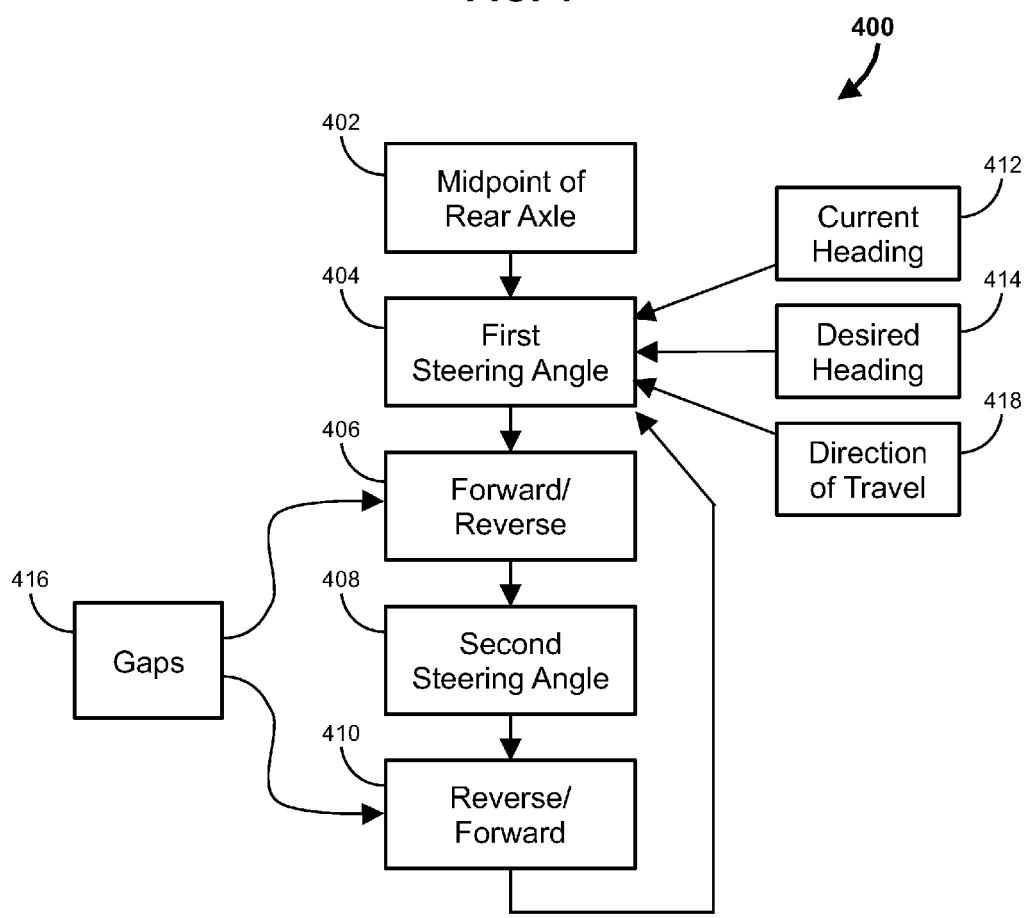
FIG. 4 is a block diagram of the method.

FIG. 4 generally shows and illustrates an example pivoting method 400 consistent with the present disclosure. The pivoting method 400 enables the vehicle 200 to match the current heading 111 to the desired heading 112 via one or more pivots. The pivoting method 400 is stored on the vehicle memory 106 and/or 107 as a pivoting program and executable by the vehicle processor 108. The vehicle 200 is thus configured to perform each block of the pivoting method 400.

Figure 3B:
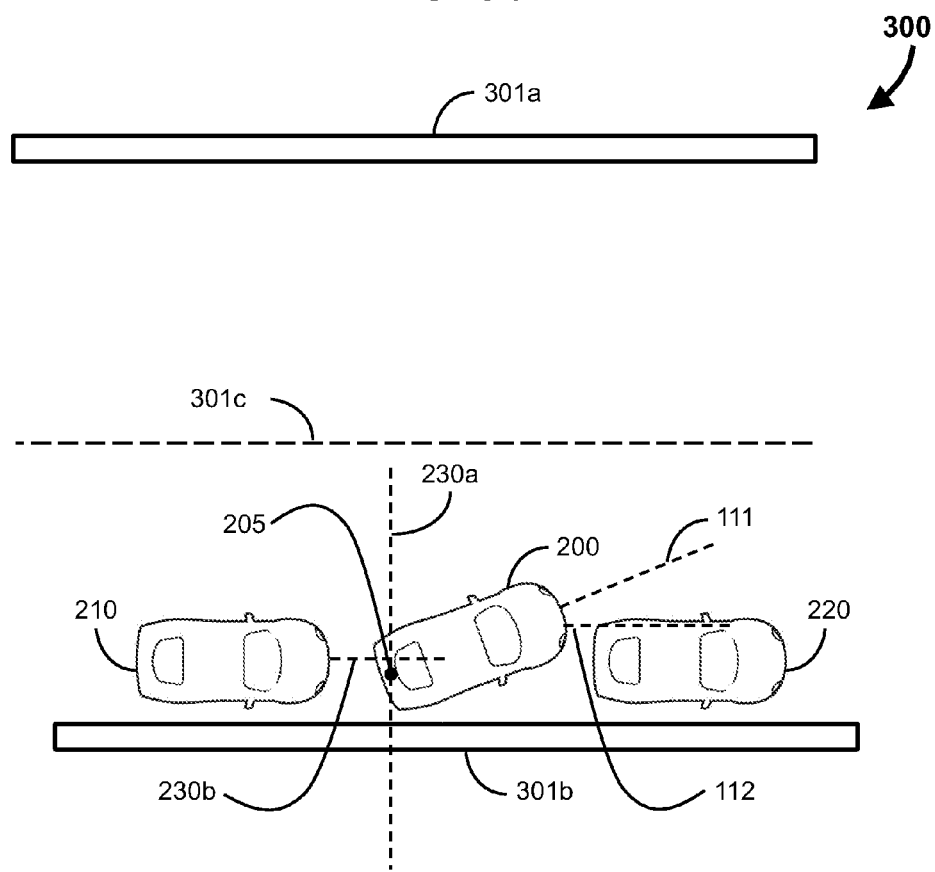

At block 402, a driver of the vehicle 200 (which could be a person or an autonomous program) positions a midpoint 205 of the rear axle at a desired location. As shown in FIG. 3b, the desired location is the intersection of lines 230a and 230b. After block 402, the driver commands the vehicle 200 to execute blocks 404 through 418 of the method 400.

At block 412, the vehicle 200 determines the current heading 111. At block 414, the driver inputs the desired heading 112. At block 418, the vehicle determines a current direction of travel (i.e., whether the vehicle is in forward or reverse).

At block 404, the vehicle 200 calculates a first steering angle of the vehicle based on the inputs of blocks 412, 414, and 418. More specifically, the vehicle 200 calculates the steering angle according to the following equation: First Steering Angle=Direction Factor*Heading Error*Gain Factor. It should be appreciated that the Steering Angle may be limited to a predetermined maximum and/or minimum.

In the above equation, direction factor is defined to be negative one when the direction of travel is forward and positive one when the direction of travel is reverse. Heading error is defined to be: current heading−desired heading. Gain factor is a predetermined and adjustable constant.

At block 416, the vehicle calculates a leading gap, A, and a trailing gap, B. With reference to FIG. 3e, the leading gap, A, may be defined between a distance tangent to a surface of the vehicle 200 closest to the leading vehicle 220. The trailing gap, B, may be defined between a distance tangent to a surface of the vehicle 200 closest to the trailing vehicle 210. At block 406, the vehicle pulls forward or reverses according to the calculated first steering angle of block 404 and based on a relevant gap of the gaps measured at block 416. If the vehicle is pulling forward, then the relevant gap is the leading gap. If the vehicle is reversing, then the relevant gap is the trailing gap. According to various embodiments, the vehicle 200 is configured to impose a predetermined maximum travel distance to block 406, such that the movement at block 406 cannot exceed the predetermined maximum travel distance.

It should be appreciated that the vehicle 200 is configured to pull forward or reverse at block 406 according to two different schemes: (a) by turning or steering the wheels while the vehicle is stationary, and before pulling forward or reversing; (b) by gradually turning or steering the wheels toward the first steering angle while the vehicle is in motion. The vehicle pulls forward or reverses until the first relevant gap falls to a predetermined minimum (i.e., the leading gap if the vehicle 200 is pulling forward; the trailing gap if the vehicle 200 is reversing) or until the vehicle 200 has traversed the predetermined maximum travel distance.

At block 408, the vehicle 200 computes a second steering angle. It should be appreciated that the second steering angle is equal to the opposite of the first steering angle computed at block 404. For example, if the first steering angle was positive ten degrees, then the second steering angle would be negative ten degrees.

At block 410, the vehicle 200 reverses or pulls forward (i.e., moves in the opposite direction of block 406) according to the second steering angle and based on a new relevant gap, which is in the opposite direction of the original relevant gap. Similar to block 406, the vehicle 200 is configured to reverse/pull forward at block 410 according to the two different schemes: (a) by turning or steering the wheels while the vehicle is stationary and before reversing; (b) by gradually turning or steering the wheels toward the second steering angle while the vehicle is in motion.

It should be appreciated that the motion of block 410 mirrors the motion at block 406. More specifically, if the vehicle moved according to scheme (a) at block 406, then the vehicle moves according to scheme (a) at block 410. If the vehicle moved according to scheme (b) at block 406, then the vehicle moves according to scheme (b) at block 410.

If the vehicle moves according to scheme (b) at block 406 and as referred to above, the vehicle gradually adjusts the steering angle as the vehicle progresses. For example, during block 406, at a distance X from the starting point at block 402, the steering angle may be Y. At a distance X+1 from the starting point at block 402, the steering angle may be Y+10. In other words, during scheme (b) the steering angle may be gradually adjusted toward the first steering angle as a function of distance or velocity of the vehicle.

At block 410, the vehicle executes the mirror image of block 406. Put differently, at block 410, the vehicle gradually adjusts the steering angle according to a mirror image of the function performed at block 406. According to the above example, and during the motion of block 410, at a distance −X from the starting point at block 408, the steering angle may be −Y. At a distance −(X+1) from the starting point at block 408, the steering angle may be −(Y+10).

The vehicle 200 travels at block 410 until the midpoint 205 of the rear axle matches the location at block 402 (i.e., intersects lines 230*a* and 230*b*). Thus, the midpoint of the rear axle of the vehicle 200 will have returned to the same position, but the current heading 111 of the vehicle 200 will more closely match the desired heading 112.

Upon executing one set of blocks 404 to 410, the vehicle will have executed a pivot wherein the midpoint 205 is in the same location as block 402, but the current heading 111 more closely matches the desired heading 112. It should thus be appreciated that the execution of blocks 404 to 410 constitutes one pivot.

While executing the method 400, the vehicle 200 continuously evaluates its position and may be configured to terminate the method 400 at any point if certain conditions are satisfied. According to various embodiments, the certain conditions include heading error. Thus, according to these embodiments, the vehicle 200 immediately terminates the method 400 when the current heading 111 is within a predetermined degree or tolerance angle of the desired heading 112. The predetermined tolerance angle may be an exact match, 1%, 5%, 1°, 5°, etc. The predetermined tolerance angle may be user adjustable. The predetermined tolerance angle may be automatically set based on a distance of the vehicle 200 from the curb, such that when the vehicle is closer to the curb the predetermined tolerance angle is higher and when the vehicle is further away from the curb, the predetermined tolerance angle is lower.

FIGS. 3*a* to 3*d* generally show and illustrate a use case of the method 400. As shown in FIGS. 3*a* to 3*d*, the vehicle 200 executes a series of pivots according to the method 400 to properly align in a parallel parking spot defined between second vehicle 210, third vehicle 220, and the bottom curb 301*b*. As shown in FIG. 3*b*, the bottom curb 310 is part of a road 300, which includes a center line 310*c* and a top curb 301*a*.

At FIG. 3*a*, the driver of the vehicle 200 (as stated above, the driver may be an automated program) reverses the vehicle 200 until the midpoint 205 of the rear axle of the vehicle 200 has been properly positioned and intersects lines 230*a* and 230*b*. The vehicle 200 may be configured to automatically calculate the intersection of lines 230*a* and 230*b* based on dimensions of the vehicle, and positions of the trailing vehicle 210, the leading vehicle 220, and the curb 301*b*. The driver of the vehicle 200 reverses until the midpoint 205 intersects lines 230*a* and 230*b*.

The driver of the vehicle 200 informs the vehicle 200 that block 402 has been achieved and that the vehicle should proceed to block 404. While stationary, the vehicle 200 finds the current heading at block 412, the desired heading an block 414, and determines the direction of travel at block 418. In the use case of FIG. 3*b*, the direction of travel is forward.

At block 404, the vehicle 200 determines the first steering angle and determines whether to implement scheme (a) or scheme (b). If the vehicle implements scheme (a), then the vehicle 200 turns the wheels to match the desired steering angle, and then pulls forward. If the vehicle implements scheme (b), then the vehicle 200 gradually turns the wheels toward the desired steering angle while pulling forward according to a predetermined function. As stated above, the predetermined function may be based on the first steering angle, and distance of the vehicle 200 (e.g., the distance of midpoint 205) from the stationary starting point of block 404 (in this case, the intersection of lines 230*a* and 230*b*).

Figure 3C:
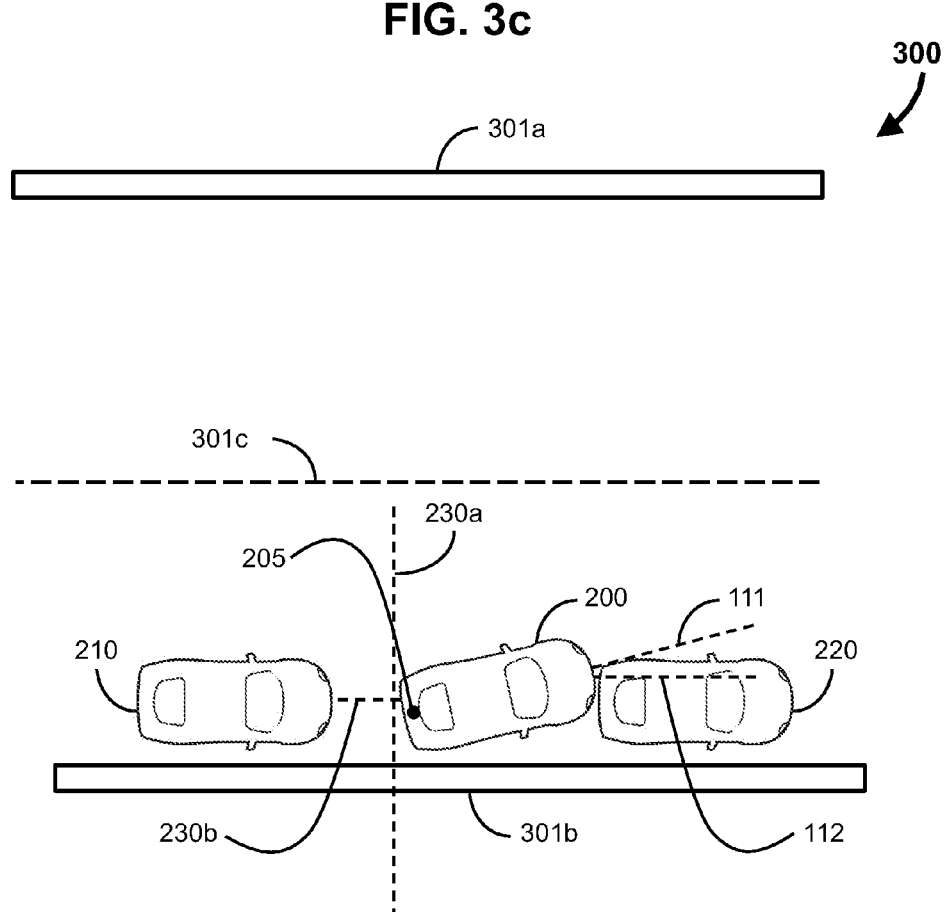

In FIG. 3*c*, the vehicle has pulled forward until the gap between the vehicle 200 and the third vehicle 220 has reached a predetermined level. The vehicle stops and calculates the second steering angle at block 408. As stated above, the second steering angle is a mirror image of the first steering angle.

Figure 3D:
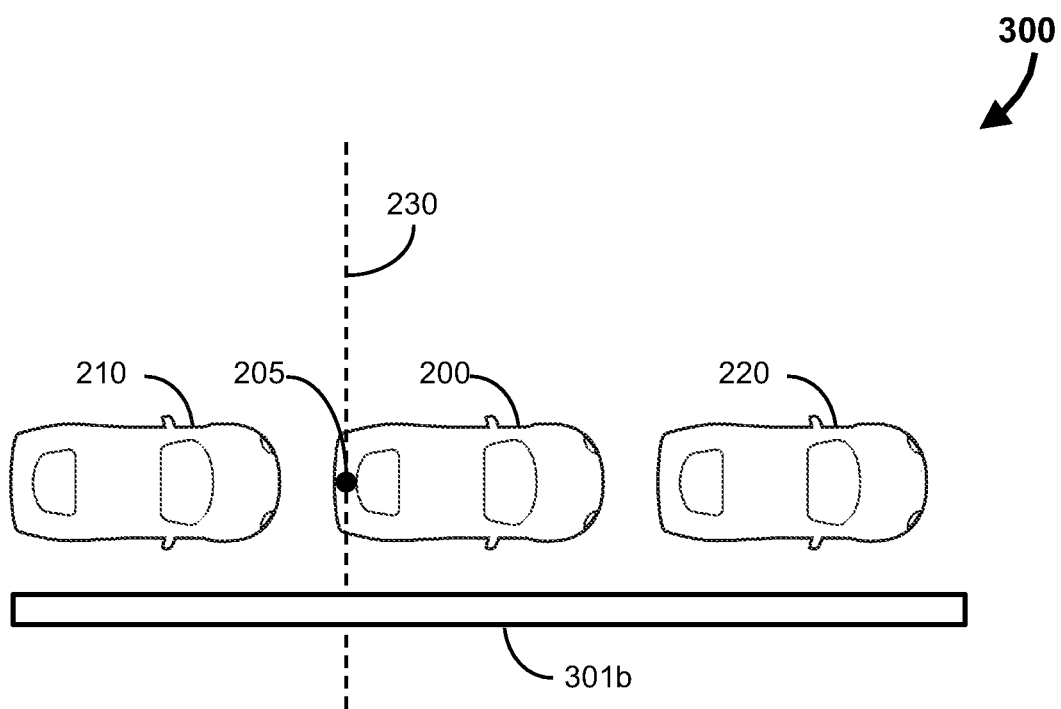
Figure 3E:
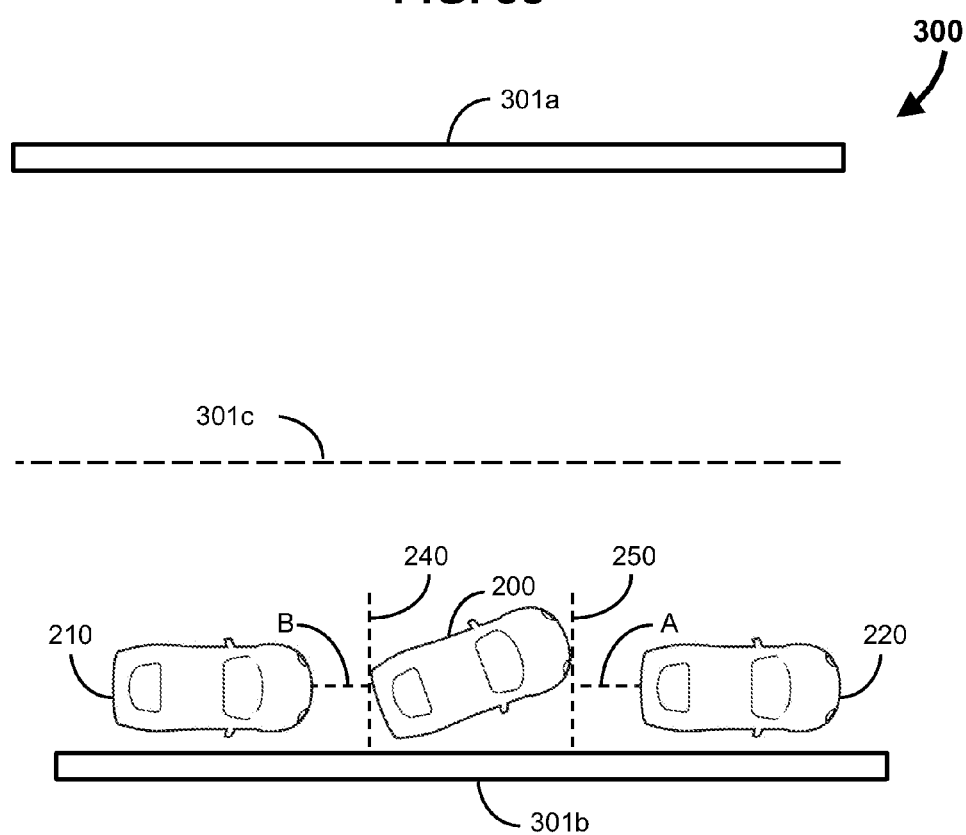

At block 410, and as shown in FIG. 3*d*, the vehicle 200 reverses until the midpoint 205 matches (within predetermined matching limits) the midpoint 205 of block 402 as shown in FIG. 3*b*. If the vehicle 200 reverses according to scheme (b), then the predetermined function may be based on the second steering angle, and distance of the vehicle (e.g., the distance of midpoint 205) from the stationary starting point at block 408 (in this case, the midpoint 205 of the vehicle 200 when the vehicle 200 was stationary at block 408). Put differently, the predetermined steering function of block 410 should mirror the predetermined steering function of block 406.

If, after block 410, the current heading 111 does not match the desired heading 112 within the predetermined tolerance angle, then the vehicle 200 returns to block 404. The vehicle perpetually cycles through blocks 404, 406, 408, and 410 until the current heading 111 matches the desired heading 112 within the predetermined tolerance angle.

FIG. 3 generally shows and illustrates an application of the method 400 to parallel park the vehicle 200. It should be appreciated that the method 400 may be applied to pulling out of or leaving a parking spot as well. In such a case, the desired heading 112 would be angled relative to the curb 301*b*. Instead of terminating when the current heading 111 matched the desired heading 112 within the predetermined tolerance angle, the method 400 (as applied to leaving a parking spot) would automatically terminate when the vehicle 200 is capable of leaving the parking spot by traveling forward or reversing at the current heading 111 without contacting obstacles.

Figure 5:
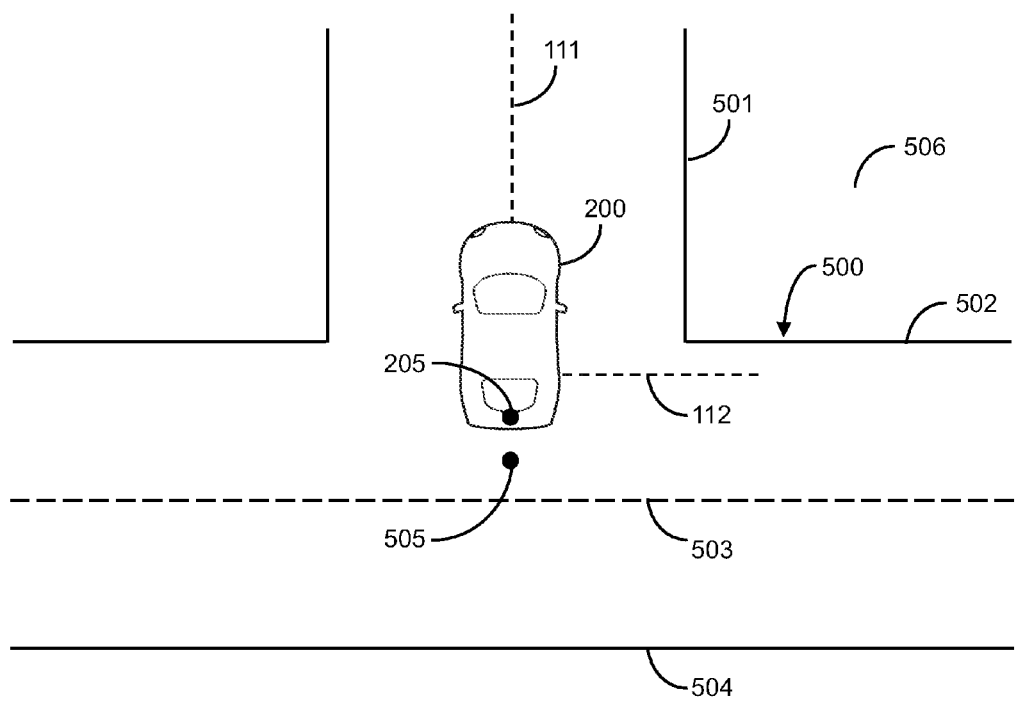
FIG. 5 shows the vehicle pulling out of a driveway according to the method of FIG. 4.

It should be appreciated that the method 400 may be applied with other use cases. For example, the method 400 may be used when backing out of a driveway. FIG. 5 shows a driveway 501 intersecting a street 500 with a top curb 502, a centerline 503, and a bottom curb 504. The current heading 111 is parallel to the driveway 501. The desired heading 112 is parallel to the road 500.

To achieve the desired heading, the vehicle 200 executes the method 400, which ultimately causes the current heading 111 to match (within the predetermined matching limits) the desired heading 112. At block 402, the driver positions the midpoint 205 of the rear axle at a desired location 505. The driver instructs the vehicle to proceed to block 404. The method 400 proceeds as previously described, except the gaps of block 416 may be set with reference to different criteria. The gaps of block 416 may be set such that (a) no portion of the vehicle 200 crosses centerline 503 and (b) the vehicle 200 always stays within the area defined by the road 500 and the driveway 501. Put differently, the gaps of block 416 may be set such that non-road (e.g., grass) 506 is set as the leading obstacle and that the centerline 503 is set as the trailing obstacle.

The invention claimed is:

1. A vehicle comprising:
    a motor;
    a steering system; and
    a processor configured to:
        (a) receive a current heading;
        (b) receive a desired heading;
        (c) calculate a first steering angle (FSA) based on (a) and (b);
        (d) automatically move the vehicle, via the motor and the steering system:
            (i) in a first direction based on the FSA;
            (ii) in a second, opposing direction, based on an opposite of the FSA.

2. The vehicle of claim 1, wherein the opposite of the FSA is equal to negative one multiplied by the FSA.

3. The vehicle of claim 1, wherein FSA equals a direction factor multiplied by a heading error and multiplied by a gain factor.

4. The vehicle of claim 3, wherein heading error equals a current heading minus a desired heading.

5. The vehicle of claim 1, wherein to move the vehicle in the second, opposing direction the processor is configured to, via the motor and the steering system, move the vehicle to mirror the movement of (d)(i).

6. The vehicle of claim 1, wherein the vehicle includes brakes and the processor is configured to stop the vehicle, via the brakes, when the current heading matches the desired heading within predetermined limits.

7. The vehicle of claim 6, wherein the processor is configured to:
    measure, via ultrasonic sensors, a distance from a curb; and
    calculate the predetermined limits as a function of the measured vehicle distance from the curb.

8. The vehicle of claim 1, wherein the processor is configured to:
    automatically move the vehicle, via the motor and the steering system, in the first direction, from a first location to a second location, thereafter automatically, and without additional user input, move the vehicle, in the second direction, from the second location to the first location.

9. The vehicle of claim 8, wherein the processor is configured to:
    detect, via ultrasonic sensors, a location of an obstacle;
    set a starting point of the vehicle as the first location, set the second location based on the location of the detected obstacle.

10. The vehicle of claim 1, wherein the processor is configured to, until the current heading sufficiently matches the desired heading, automatically repeat:
    calculating the FSA based on the current heading and the desired heading; and
    moving the vehicle, via the motor and the steering system, in a first direction based on the FSA and in a second, opposing direction, based on an opposite of the FSA.

11. A method comprising:
    (a) receiving, via a steering system, a current heading;
    (b) receiving, via the steering system, a desired heading;
    (c) calculating, via at least on processor, a first steering angle (FSA) based on (a) and (b);
    (d) automatically moving a vehicle, via a motor and the steering system:
        (i) in a first direction based on the FSA;
        (ii) in a second, opposing direction, based on an opposite of the FSA.

12. The method of claim 11, wherein the opposite of the FSA is equal to negative one multiplied by the FSA.

13. The method of claim 12, wherein FSA equals a direction factor multiplied by a heading error and multiplied by a gain factor.

14. The method of claim 13, wherein heading error equals a current heading minus a desired heading.

15. The method of claim 14, wherein moving the vehicle in the second, opposing direction comprises moving the vehicle to mirror the movement of (d)(i).

16. The method of claim 15, wherein the vehicle includes brakes and the method comprises: stopping the vehicle, via the brakes controlled by the at least one processor, when the current heading matches the desired heading within predetermined steering angle limits.

17. The method of claim 16, comprising:
    measuring, via ultrasonic sensors, a distance to a curb;
    calculating, via the at least one processor, the predetermined steering angle limits as a function of the measured vehicle distance from the curb.

18. The method of claim 17, comprising:
    detecting, via ultrasonic sensors, a location of an obstacle;
    setting, via the at least one processor, a starting point of the vehicle as a first location, setting a second location based on the location of the detected obstacle; and
    automatically moving the vehicle, via the motor and the steering system controlled by the at least one processor, in the first direction, from the first location to the second location, and thereafter, without additional user input, automatically moving the vehicle, in the second direction, from the second location to the first location.

19. The method of claim 18, comprising, via the at least one processor, until the current heading matches the desired heading, automatically repeat: calculating the FSA based on the current heading and the desired heading; and moving the vehicle, via the motor and the steering system, in a first direction based on the FSA and in a second, opposing direction, based on an opposite of the FSA.

* * * * *